United States Patent
Stanzel

(10) Patent No.: US 7,755,000 B2
(45) Date of Patent: *Jul. 13, 2010

(54) SPOOL GUN HAVING UNITARY SHIELDING GAS AND WELD POWER CONNECTOR

(75) Inventor: Kenneth A. Stanzel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/686,788

(22) Filed: Mar. 15, 2007

(65) Prior Publication Data

US 2007/0158313 A1 Jul. 12, 2007

Related U.S. Application Data

(62) Division of application No. 10/906,128, filed on Feb. 3, 2005, now Pat. No. 7,208,699.

(51) Int. Cl.
*B23K 9/32* (2006.01)
*B23K 9/28* (2006.01)

(52) U.S. Cl. .............................. 219/137.2; 219/137.31; 219/137.63

(58) Field of Classification Search .............. 219/130.1, 219/137.31, 137.63, 137.9
See application file for complete search history.

(56) References Cited

U.S. PATENT DOCUMENTS

| 4,529,861 | A | | 7/1985 | Blanton |
| 4,864,099 | A | | 9/1989 | Cusick, III et al. |
| 5,357,076 | A | | 10/1994 | Blankenship |
| 5,491,321 | A | | 2/1996 | Stuart et al. |
| 5,916,464 | A | * | 6/1999 | Geiger ................... 219/137.71 |
| 6,758,423 | B1 | * | 7/2004 | Perkins et al. .............. 239/690 |
| 6,855,914 | B1 | * | 2/2005 | Kaufman et al. ....... 219/137.71 |
| 2003/0089689 | A1 | | 5/2003 | Conway et al. |

FOREIGN PATENT DOCUMENTS

| EP | 0074430 A1 | | 3/1983 |
| EP | 0315924 A1 | | 5/1989 |
| GB | 1354395 | | 5/1974 |
| WO | WO 9320383 A1 | * | 10/1993 |
| WO | WO 0044523 A1 | * | 8/2000 |

* cited by examiner

*Primary Examiner*—Stephen J Ralis
(74) *Attorney, Agent, or Firm*—Fletcher Yoder P.C.

(57) ABSTRACT

A spool gun having a quick connector connectable to an electrical power source and a gas source is disclosed. A connection line extends from the spool gun and is attached to a connector. The connector both fluidly connects the spool gun to a shielding gas source and electrically connects the spool gun to a power source constructed to generate a welding-type power. Such a spool gun is quickly and efficiently connectable to the gas and power systems required for performing welding processes.

12 Claims, 3 Drawing Sheets

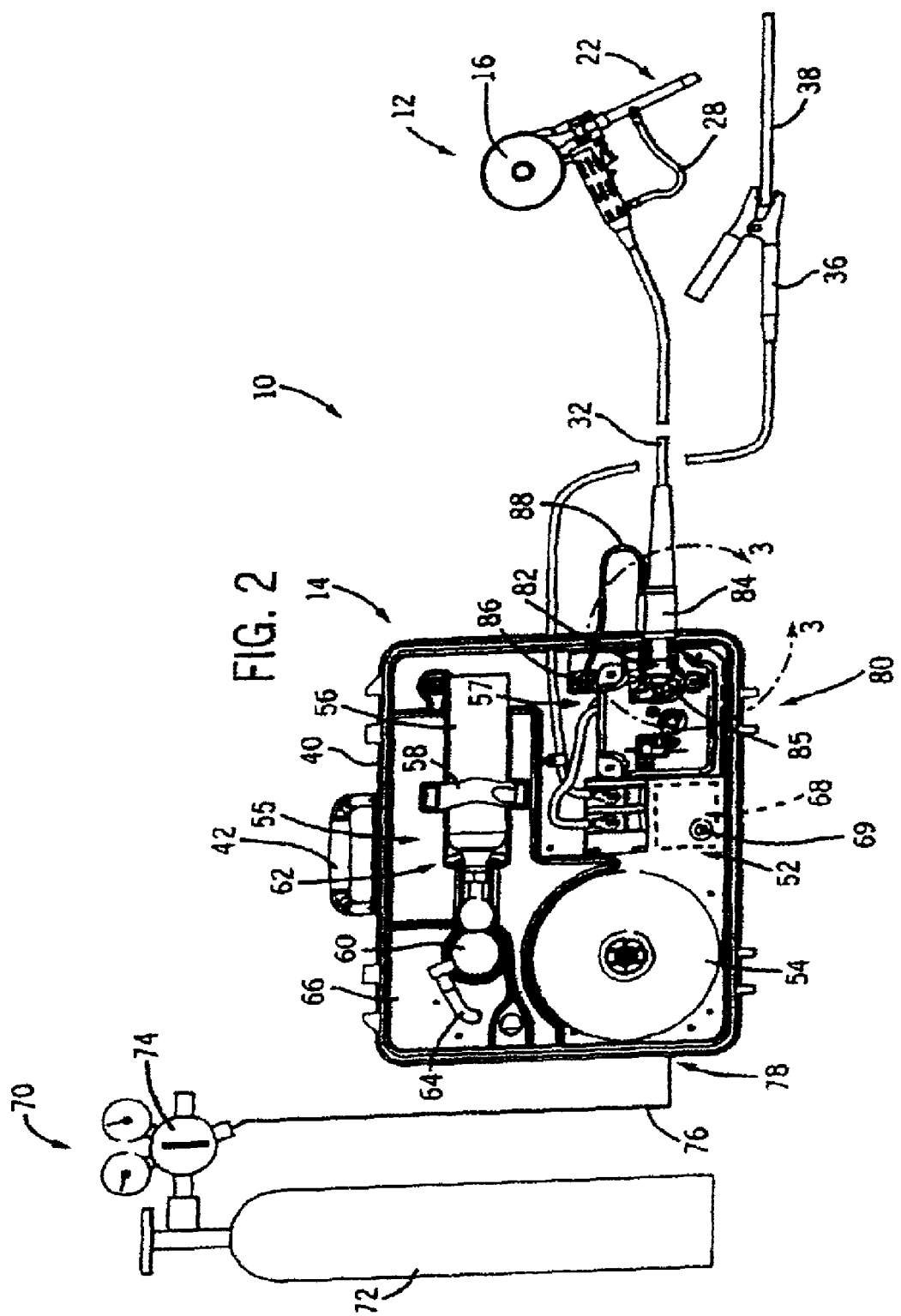

SPOOL GUN HAVING UNITARY SHIELDING GAS AND WELD POWER CONNECTOR

CROSS-REFERENCE TO RELATED APPLICATION

This application is a divisional of, and claims priority to, U.S. Ser. No. 10/906,128, filed Feb. 3, 2005, the disclosure of which is incorporated herein.

BACKGROUND OF THE INVENTION

The present invention relates generally to welding-type devices and, more particularly, to a connector for a spool gun to communicate both electrical power and shielding gas to the spool gun.

Welding-type systems generally include a power source constructed to generate a welding-type power. The welding-type power is communicated to a torch or a gun via a weld cable that extends between the torch and the power source. Some systems contain a consumable weld wire that is fed to the torch. The consumable weld wire can be pushed or pulled using a single motor wire feeder, or can be push/pulled by a dual motor wire feeder from or near the power source to the torch. During the welding process, the consumable weld wire is delivered from the torch to a weld pool.

Some other systems include a spool mounted directly on the weld torch to supply the consumable weld wire to the weld. Such "spool guns" include a supply of consumable weld wire and a wire feeder assembly supported on the torch. By positioning the source of consumable weld wire and the wire feed assembly on the torch, allows one power source to be used for multiple applications, allows for easier transport, and reduces the size of the overall systems. Additionally, the use of a spool gun also enables the use of consumable weld wires that cannot physically support being pushed or pulled from the power source to the torch. That is, some consumable weld wires cannot support the stresses associated with being pushed and/or pulled from the power source to the torch. Therefore, a spool mounted gun allows the use of lighter gauge and/or less rigid consumable weld wires, such as aluminum based wire.

The spool gun torch not only must be electrically connected to a power source, it also requires a shielding gas connection. The electrical connection is often made by a stud and fastener connection of a weld cable to an appropriate terminal of a power source. Such connections usually require a tool, such as a wrench, to loosen and tighten the fasteners associated with the connection.

In addition to electrically connecting the spool gun to a source of welding-type power, the spool gun must also be fluidly connected to a source of shielding gas. The shielding gas connection often requires another tool to tighten/loosen associated threaded components. The gas connection is generally separate and distinct from the electrical connection of the spool gun with the power source. As such, an operator desiring to perform a welding process with a spool gun must complete two separate connections—the shielding gas system connection and the weld-power electrical connection, each requiring a tool to remove and secure the connections. Accordingly, the operator must also locate or have on hand the necessary tools required to complete the connection/disconnection processes. Accordingly, connecting a spool gun to a weld-type power and a shielding gas source is time consuming and detrimentally affects process efficiency.

It would therefore be desirable to have an assembly and welding-type system capable of quickly and efficiently toollessly connecting a spool gun to electrical power and shielding gas.

BRIEF DESCRIPTION OF THE INVENTION

The present invention provides a spool gun assembly and welding-type system and that solves the aforementioned problems. The spool gun includes a connector that connects the spool gun to a shielding gas source and an electrical power source without the use of tools.

Therefore, in accordance with one aspect of the present invention, a torch for welding-type systems is disclosed. The torch includes a spool gun constructed to receive a spool of consumable wire and is connected to a gas supply hose and an electrical supply cable. The torch includes a single connector connectable to both a source of gas and a source of electrical power and is connected to the gas supply hose and the electrical supply cable to deliver gas and electrical power to the spool gun.

According to another aspect of the present invention, a welding system having a power source constructed to generate a power signal suitable for welding-type operations is disclosed. The welding system includes a gas supply constructed to provide a shielding gas to a weld. The system also includes a torch having a supply of consumable weld wire supported thereon and a quick connector. The quick connector is constructed to connect the torch to both the power source and the gas supply.

According to a further aspect of the present invention, a spool gun assembly is disclosed that includes a spool gun handle having a tip at one end, a gas path therethrough, and a power cable attached to a second end. The gun includes a drum thereon to hold a spool of wire. A weld wire drive assembly is attached to the spool gun handle and is constructed to deliver a consumable weld wire from the spool of wire to a tip of the spool gun assembly. The assembly includes a unitary means for connecting both the gas path to a gas system and the power cable to a power source to deliver welding-type power and shielding gas to the tip of the spool gun assembly.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is an elevational view of the welding system shown in FIG. 1 with a cover removed from the power source of the welding system and an optional bulk shielding gas source fluidly connected to the power source.

DETAILED DESCRIPTION OF THE PREFERRED EMBODIMENT

Figure 1:
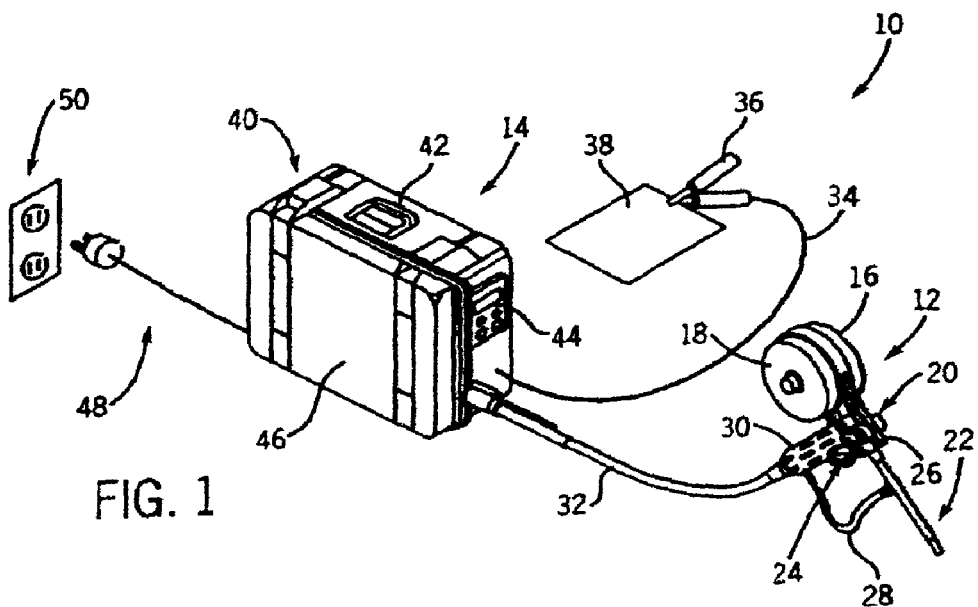
FIG. 1 is a perspective view of a spool gun connected to a welding system according to one embodiment of the present invention.

FIG. 1 shows a welding-type system 10 having a spool gun 12 connected to a power source 14. Spool gun 12 has a drum 16 with a removable cover 18 attached thereto. Drum 16 is constructed to receive and dispense a supply of a consumable weld wire therein. Spool gun 12 includes a wire feeder drive assembly 20 constructed to feed the consumable weld wire from drum 16 to a tip 22 of spool gun 12 upon actuation of a trigger 24 of spool gun 12. Depression of trigger 24 initiates movement of a feed roller 26 of drive assembly 20. Feed roller 26 is in contact with the consumable weld wire such that rotation of feed roller 26 results in consumable weld wire being delivered to tip 22 of spool gun 12.

A shielding gas is also delivered to tip 22 of spool gun 12 during actuation of trigger 24. A gas hose 28 extends from a handle portion or body 30 of spool gun 12 to tip 22. Alternatively, it is understood that gas hose 28 could be a passage formed internally to body 30 of spool gun 12. Gas hose 28 fluidly connects tip 22 of spool gun 12 to a connection line 32 of spool gun 12. Connection line 32 of spool gun 12 communicates a shielding gas and welding-type electrical power from power source 14 to spool gun 12.

Power source 14 also has a grounding cable 34 extending therefrom. Cable 34 has a work clamp 36 attached thereto wherein the work clamp is constructed to securely engage a workpiece 38. When trigger 24 of spool gun 12 is depressed, consumable weld wire is delivered from tip 22 of spool gun 12. With trigger 24 depressed, as tip 22 is moved toward workpiece 38, an arc is eventually generated between the consumable weld wire and the workpiece and a welding-type process is achieved.

Power source 14 has a housing 40 with a handle 42 positioned about the internal components of the power source. A control panel 44 allows an operator to control the power source when a cover 46 of housing 40 is located in a closed position as shown in FIG. 1. A power cord 48 extends from power source 14 and is constructed to engage an outlet 50 such that power source 14 is powered by a utility grid or the like. Alternatively, it is understood that power source 14 could be powered by a generator internal or external to housing 40. Understandably, the generator could also be powered by an internal combustion engine or the like thereby providing an untethered power source configured to generate power signals suitable to welding-type applications.

FIG. 2 shows welding-type system 10 with the cover of housing 40 removed from power source 14 exposing the internal components 52 thereof. As shown, power source 14 is not limited to use with spool gun 12. In the particular embodiment shown, power source 14 is constructed to include a consumable weld wire 54 fed via a wire feeder 57. However, since spool gun 12 has its own supply of wire 16, consumable weld wire 54 is not delivered to spool gun 12. As such, power source 14 is constructed to be used with multiple different welding-type guns thereby providing a highly versatile welding-type power source. Alternatively, spool gun 12 is constructed for use with various power sources, such as those not containing internal weld wire 54.

Power source 14 has a first gas system 55 which includes a pressure vessel 56 secured in power source 14 by a strap 58. Pressure vessel 56 is constructed to supply shielding gas to spool gun 12. A regulator 60 is connected to an end 62 of pressure vessel 56 such that when pressure vessel 56 is connected to power source 14, shielding gas is delivered to regulator 60 from pressure vessel 56. A hose 64 extends from regulator 60 and passes behind a shroud 66 of power source 14. Hose 64 fluidly connects regulator 60 to a valve 68, shown in phantom, connected to a selector switch 69. Valve 68 is also fluidly connected to an optional second gas system 70.

Optional second gas system 70 includes a bulk gas cylinder 72 and a bulk regulator 74 connected thereto. A hose 76 extends between power source 14 and bulk regulator 74 and removeably connects second gas system 70 to power source 14 at connection 78. Connection 78 fluidly communicates shielding gas from second gas system 70 to valve 68 having selector switch 69 such that an operator can select between first gas system 55 and second gas system 70. Such a construction allows power source 14 to be provided with shielding gas from a bulk cylinder when less mobility of the power source is required than when shielding gas is provided from pressure vessel 56. When second gas system 70 is disconnected from power source 14, first gas system 55 provides a lightweight and highly transportable source of shielding gas supported by power source 14. Handle 42 provides for single-handed transportation of the gas system equipped power source 14.

Valve 68 is fluidly connected to a clamp, or weld cable port 80 of power source 14. Weld cable port 80 includes a receptacle 82 constructed to receive a connector 84 of spool gun 12. Weld cable port 80 is constructed to attach connection line 32 of spool gun 12 to both a welding-type electrical power signal and a supply of weld shielding gas. Power source 14 includes a securing screw 85 having a T-handle shape and constructed to engage connector 84 and secure connection line 32 of spool gun 12 to weld cable port 82 without the use of tools. Alternatively, it is understood connector 84 of spool gun 12 could be constructed in a quick connectable manner such that connector 84 could be connected and removed from power source 14 through manipulation of the connector relative to the associated weld cable port without the use of additional clamping screws or the like. Once securely attached to power source 14, connection line 32 of spool gun 12 communicates weld power and shielding gas from power source 14 to spool gun 12 through connector 84.

Connector 84 of spool gun 12 includes a multi-pin control connector 86 connectable to power source 14. Multi-pin connector 86 extends from connector 84 via a cable 88 and identifies the type of torch connected to power source 14 and supplies feedback control signals. Accordingly, when spool gun 12 is connected to power source 14, wire feeder 57 is disabled from supplying consumable weld wire 54 from power source 14 to a torch.

Figure 3:
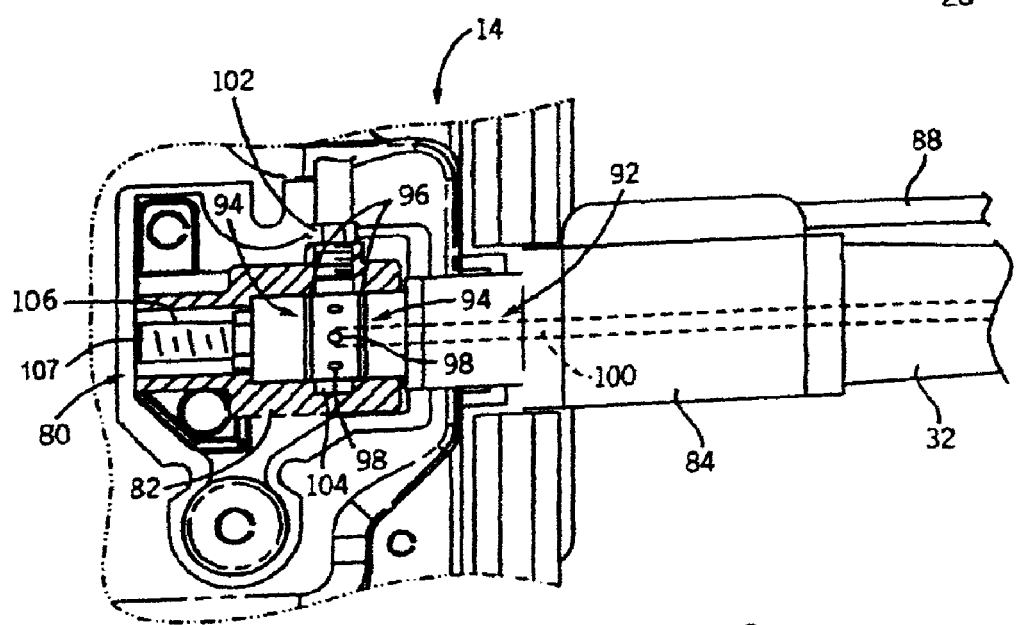
FIG. 3 is a detailed view of the connection between the spool gun and the power source taken along line 3-3 of FIG. 2.

The engagement between connector 84 and receptacle 82 of weld cable port 80 is shown in greater detail in FIG. 3. As shown in FIG. 3, connector 84 includes a shank 92 extending therefrom. Shank 92 is constructed of a conductive material and communicates a welding-type power from power source 14 through connection line 32 to the spool gun. Connector 84 has a pair of grooves 94 formed therein with an O-ring 96 positioned in each of the grooves to form a seal therebetween. A plurality of orifices 98, or gas openings, are formed radially through shank 92 and are in fluid communication with a gas passage 100 formed through connector 84 and connection line 32 of the spool gun.

Receptacle 82 of weld cable port 80 is constructed to snuggly receive shank 92 of connector 84 therein. A shielding gas port 102 is formed in receptacle 82 and is fluidly connected to valve 68 shown in FIG. 2. A channel 104 is formed in receptacle 82 generally aligned with shielding gas port 102. When connector 84 is fully inserted into receptacle 82 of weld cable port 80, O-rings 96 generally flank channel 104 and sealingly engage receptacle 82 such that shielding gas introduced into channel 104 flows through orifices 98 and into gas passage 100. Accordingly, connector 84 communicates both shielding gas and welding-type power from power source 14 through connection line 32 to the spool gun.

It is understood and within the scope of the claims that the engagement between connector 84 and receptacle 82 could be of many specific constructions other that recited above. For example, receptacle 82 could be constructed to threadingly engage an optional threaded portion 106 of connector 84. Threaded portion 106 could be located at an end 107 of connector 84 or located remotely therefrom. Because no consumable weld wire or shielding gas is passed through end 107 of the connector, end 107 could have a closed construction. Opposite threaded portion 106 would be a single O-ring and an orifice could be positioned therebetween. Positioning the orifice between threaded portion 106 and the single O-ring forms an alternate connector that is quickly and efficiently connectable to a welding-type power source and constructed to communicate both shielding gas and welding-type power to a torch connected to the power source.

A spool gun equipped according to the present invention is quickly and conveniently connectable to a source of shielding gas and a source of welding-type power through a unitary connector. That is, rather than making a first connection to a source of shielding gas and a second connection with a source of electrical power, the spool gun according to the present invention only requires one connection to form a completely operable, shielding gas equipped, spool gun operating welding system. Additionally, a spool gun equipped according to the present invention improves operator maneuverability of the spool gun by having both the welding-type power cable and the shielding gas supply line integrated into a single connection line such that multiple gas/power lines are not positioned across a work area. Alternatively, it is understood there may be instances when it is desirable to have a shielding gas line at least partially independent from a welding-type power cable.

Figure 4:
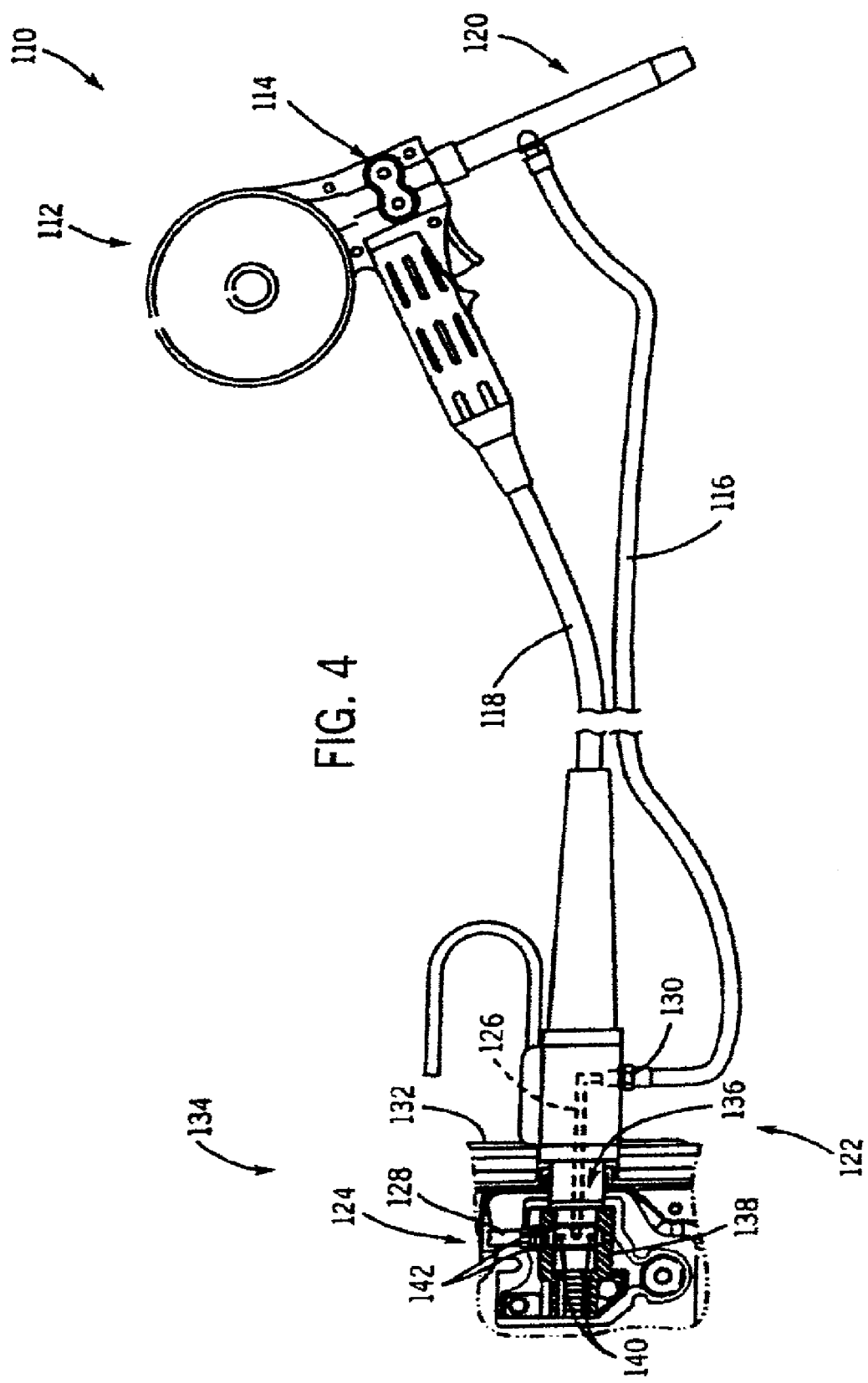
FIG. 4 is an alternate embodiment of the spool gun shown in FIG. 1.

FIG. 4 shows an alternate embodiment of the present invention. As shown in FIG. 4, a spool gun 110 includes a spool of consumable weld wire 112 and a wire feed assembly 114. Spool gun 110 is substantially similar to spool gun 12 shown in FIG. 1 however, spool gun 110 has a gas line 116 and an electrical weld power cable 118 generally separate from each other. As shown in FIG. 4, gas line 116 extends between a tip 120 of spool gun 110 and a connector 122. Connector 122 engages weld cable port 124 similar to connector 84 of spool gun 12 shown in FIG. 2. A gas passage 126 passes through connector 122 and fluidly connects a gas supply 128 of weld cable port 124 to a gas port 130 of connector 122. Gas port 130 is external to a housing 132 of a welding-type power source 134 such that gas line 116 is removably attachable to connector 122 of spool gun 110. Accordingly, gas line 116 can be connected to alternate gas sources aside from gas supply 128.

Weld power cable 118 electrically connects spool gun 112 to power source 134 via connector 122. A shank 136 of connector 122 slidingly engages a receptacle 138 of power source 134 and electrically connects weld power cable 118 to power source 134. A plurality of orifices 140 pass through shank 136 and fluidly communicate shielding gas from gas supply 128 to gas passage 126. A pair of O-rings 142 flank orifices 140 and prevent gas from passing beyond receptacle 138 other than through gas passage 126. Connector 122 fluidly connects spool gun 110 to a shielding gas source and electrically connects spool gun 110 to a welding-type power signal.

As one skilled in the art will fully appreciate the heretofore description of welding devices and reference to welding power, welding-type power, or welders generally, includes welding, cutting, or heating power. Description of a welding apparatus illustrates just one embodiment in which the present invention may be implemented.

Therefore, one embodiment of the present invention includes a torch for welding-type systems including a spool gun. The spool gun is constructed to receive a spool of consumable wire and is connected to a gas supply hose and an electrical supply cable. The torch includes a single connector connectable to both a source of gas and a source of electrical power and is connected to the gas supply hose and the electrical supply cable to deliver gas and electrical power to the spool gun.

Another embodiment of the present invention includes a welding system having a power source constructed to generate a power signal suitable for welding-type operations. The welding system includes a gas supply constructed to provide a shielding gas to a weld, a torch having a supply of consumable weld wire supported thereon, and a quick connector. The quick connector is constructed to connect the torch to both the power source and the gas supply.

A further embodiment of the present invention includes a spool gun assembly that includes a spool gun handle having a tip at one end, a gas path therethrough, and a power cable attached to a second end. The spool gun includes a drum thereon to hold a spool of wire. A weld wire drive assembly is attached to the spool gun handle and is constructed to deliver a consumable weld wire from the spool of wire to a tip of the spool gun assembly. The assembly includes a unitary means for connecting both the gas path to a gas system and the power cable to a power source to deliver welding-type power and shielding gas to the tip of the spool gun assembly.

The present invention has been described in terms of the preferred embodiment, and it is recognized that equivalents, alternatives, and modifications, aside from those expressly stated, are possible and within the scope of the appending claims.

What is claimed is:

1. A welding system comprising:
a portable power source constructed to generate a power signal suitable for welding-type operations and housed in a suitcase enclosure;
a gas supply inlet passage in the suitcase enclosure to provide a shielding gas from a gas supply;
a torch connectable to the suitcase enclosure, the torch comprising a spool gun constructed to receive a spool of consumable wire;
a connector constructed to connect the torch to the portable power source and transmit both welding power from the portable power source and the shielding gas from the gas supply to the torch;
a multi-pin control connector attached to the connector and configured to provide identification data regarding the torch; and
a wire feeder housed in the suitcase enclosure, wherein the welding system is configured to selectively disable operation of the wire feeder housed in the suitcase enclosure in response to the identification data.

2. The welding system of claim 1 wherein the multi-pin control connector attached to the connector is further configured to provide feedback control signals between the torch and the portable power source.

3. The welding system of claim 1 wherein the gas supply is housed in the suitcase enclosure.

4. The welding system of claim 3 wherein the gas supply inlet passage is configured to be connectable to an additional gas supply external to the suitcase enclosure.

5. The welding system of claim 1 further comprising a drive assembly attached to the spool gun and constructed to deliver the consumable weld wire from the spool of consumable weld wire to a weld during a welding operation.

6. The welding system of claim 5 further comprising a trigger attached to the spool gun and operatively connected to the drive assembly.

7. A portable suitcase-type welding device comprising:
   a power source to generate a welding-type power enclosed within a suitcase housing;
   a gas source positioned within the suitcase housing to supply a shielding gas;
   a spool gun assembly constructed to receive a spool of consumable weld wire;
   a single connector connecting the spool gun assembly to the suitcase housing, wherein the single connector includes an electrical supply cable and a gas supply hose therein to connect to the power source and the gas source within the suitcase housing;
   a multi-pin control connector attached to the single connector and configured to provide identification data regarding the spool gun assembly; and
   a wire feeder housed in the suitcase housing, wherein the portable suitcase-type welding device is configured to selectively disable operation of the wire feeder housed in the suitcase housing in response to the identification data.

8. The portable suitcase-type welding device of claim 7 wherein the suitcase housing includes a handle thereon to provide for transportation of the power source and the gas source.

9. The portable suitcase-type welding device of claim 7 wherein the single connector further comprises an outer periphery, the outer periphery having a pair of grooves formed therein that generally flank at least one gas opening formed in the outer periphery that is constructed to allow passage of gas to the gas supply hose of the single connector.

10. The portable suitcase-type welding device of claim 9 further comprising a pair of O-rings, wherein one O-ring is positioned in each groove of the pair of grooves.

11. A torch for welding-type systems comprising:
    a spool gun constructed to receive a spool of consumable wire and connected to a gas supply hose and an electrical supply cable;
    a single connector connectable to both a portable gas source and a portable source of electrical power, the single connector connected to the gas supply hose and the electrical supply cable to deliver gas and electrical power to the spool gun; and
    a multi-pin control connector attached to the single connector and configured to provide identification data regarding the spool gun to the portable source of electrical power;
    wherein the portable source of electrical power is configured to selectively disable operation of a wire feeder separate from the spool gun in response to the identification data, and wherein the single connector has a threading formed thereabout and a seal and a gas passage formed through the single connector between the threading and the seal.

12. The torch of claim 11 wherein the portable gas source and the portable source of electrical power are positioned within a suitcase enclosure.

* * * * *